Sept. 20, 1966       J. E. HUDSON ETAL       3,274,314
                THERMOPLASTIC FILM PRODUCTION
Filed June 13, 1963                    2 Sheets-Sheet 1
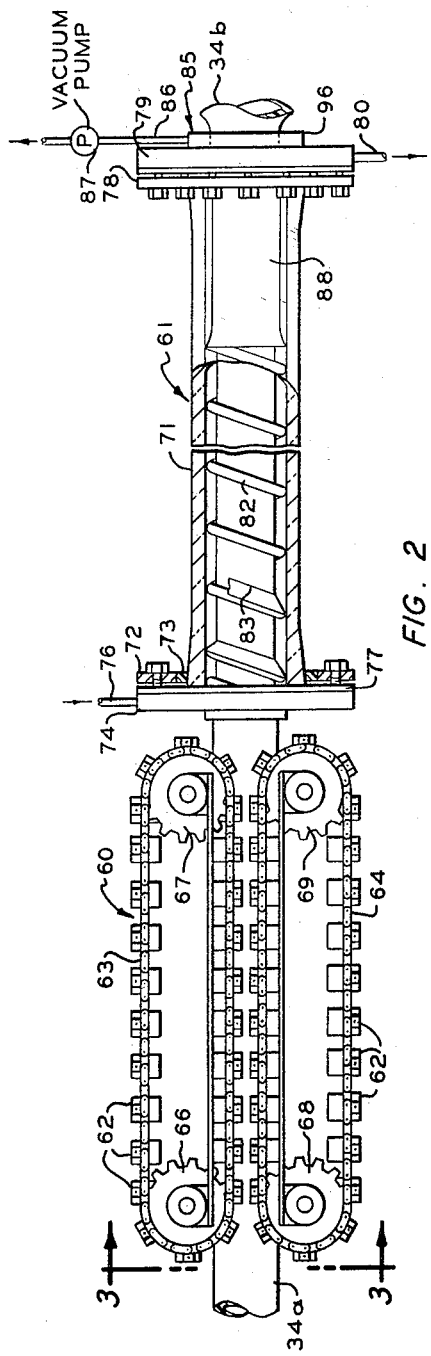
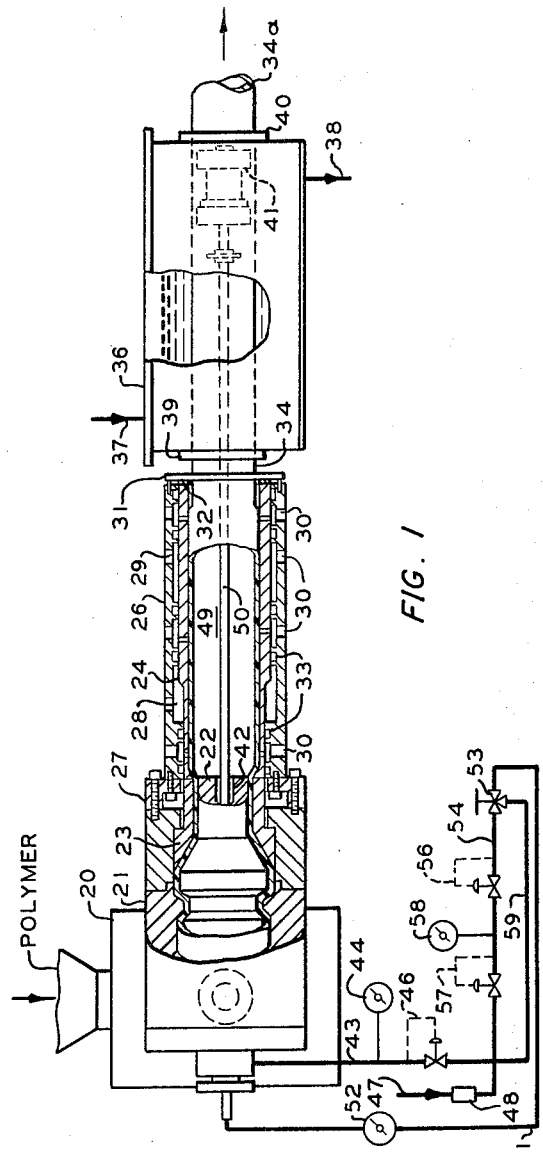
INVENTORS
C.E. OGIER
J.E. HUDSON
BY *Young & Quigg*
ATTORNEYS

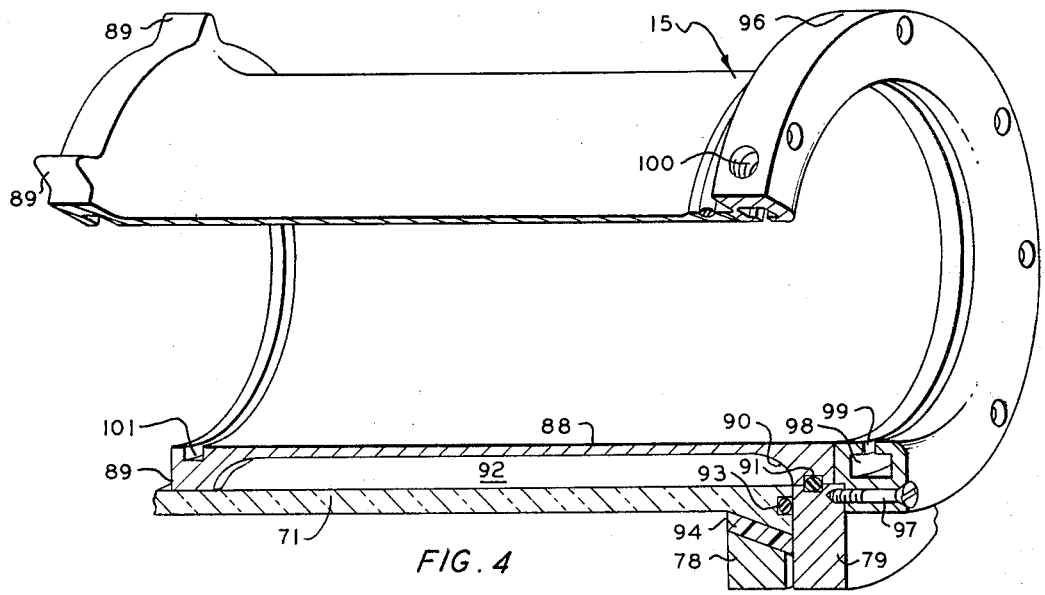
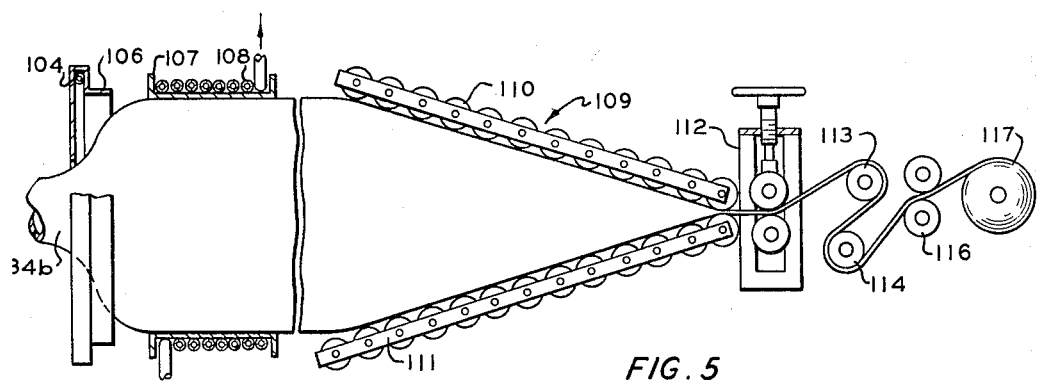
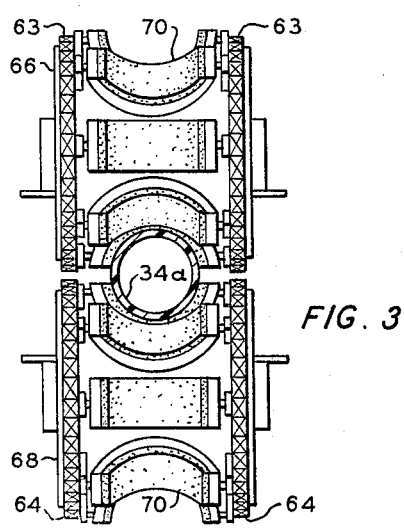

United States Patent Office 3,274,314
Patented Sept. 20, 1966

3,274,314
THERMOPLASTIC FILM PRODUCTION
Jimmie E. Hudson, Bartlesville, Okla., and Clayton E. Ogier, Boulder, Colo., assignors to Phillips Petroleum Company, a corporation of Delaware
Filed June 13, 1963, Ser. No. 287,538
3 Claims. (Cl. 264—92)

This invention relates to the production of biaxially oriented film from crystalline thermoplastic polymers.

It is well known that molecular orientation of various crystallizable thermoplastic polymers in the form of sheets, films, filaments, tapes, tubes, pipe, or the like increases the tensile strength of these structures. This orientation is commonly brought about by stretching the polymeric structure after formation at temperatures sufficiently low that the polymer is in a substantially crystalline condition. If the temperature of the polymer is increased to the point that substantially all of the crystallites have melted, very little orientation occurs when the structure is stretched. Numerous methods have developed for the continuous production of oriented polymeric structures by extruding the polymer in the shape desired, subsequently cooling it to a temperature below the temperature required for the formation of crystals, and thereafter stretching the structure by placing it under tension. Biaxial orientation can be brought about by stretching the sheet or film first in one direction and then in a second direction at approximately right angles to the direction of the initial stretch. However, this sequential stretching is not desirable for many materials, particularly the crystallizable olefin polymers such as polyethylene, polypropylene and the like, since the beneficial results obtained in the initial stretch are considerably diminished by the second step of the orientation. Simultaneous biaxial stretching is desirable for the production of ziaxially oriented films of these polymers.

An improved procedure for simultaneous biaxial stretching has recently been developed wherein the polymer melt is first extruded in the shape of a tube which is then cooled and reheated to a temperature within a few degrees below the crystalline melting point of the polymer, thereby placing it at the orientation temperature. The tube is then stretched biaxially by simultaneous radial expansion and linear extension, and finally cooled to set the orientation. It is desirable to direct a current of cooling gas onto the outer surface of the tube as it is being stretched biaxially. The use of such a cooling gas establishes a minimum temperature gradient over the expanding bubble, and the film thus produced has a balance of tensile and elongation properties in both the machine and the transverse directions which makes it tough and highly resistant to rupture on impact.

In the foregoing procedure, the tube is usually heated by passage through an elongated heater. Such a heater can be in the form of a cylindrical tank wherein a heated liquid makes direct or indirect contact with the outer surface of the tube. Unfortunately, there is often a tendency for the tube to shrink in diameter near the outlet of the heater. This shrinkage or "neckdown" appears to be caused by some stretching occurring within the heater instead of all of the stretching occurring downstream from the heater simultaneously with the radial stretching. In accordance with the present invention, this problem is overcome by the use of a vacuum drag ring at the outlet of the heater. The reduced pressure on the exterior of the tube tends to increase the drag on the tube at this point to reduce stretching of the tube within the heater. In addition, the tube is retained against the heat exchange surface or material of the heater.

Accordingly, it is an object of this invention to provide an improved method of producing a biaxially oriented film of thermoplastic crystallizable polymer.

Another object is to provide apparatus for use in the production of such a film.

Other objects, advantages and features of the invention will be apparent to those skilled in the art from the following detailed description, taken in conjunction with the accompanying drawing in which:

FIGURE 1 illustrates a tube extruder die head, sizing and cooling sleeve, and cooling bath of film producing apparatus useful in practicing this invention;

FIGURE 2 illustrates a tube pulling means and the reheating bath, the latter having the drag ring of this invention incorporated therein;

FIGURE 3 is an end view of the tube pulling means;

FIGURE 4 is a perspective view of the drag ring employed in the heating bath; and FIGURE 5 illustrates apparatus used for cooling, chilling and collapsing the expanded tube, and winding up the collapsed film.

While this invention can be used advantageously in the fabrication of any crystallizable thermoplastic polymer, such as polyvinylidine chloride, nylon, polyethylene glycol terephthalate or the like, it is particularly useful in the biaxial orientation of the highly crystalline olefin polymers, such as polyethylene, polypropylene, poly-1-butene, poly-4-methylpentene-1 and other homopolymers and copolymers of similar mono-1-olefins containing up to 8 carbon atoms per molecule. Examples of such polymers are isotactic polypropylene and polybutenes and the high density ethylene polymers, particularly the homopolymers of ethylene and copolymers of ethylene with higher mono-1-olefins, these polymers having a density of about 0.940 to 0.990 gram per cubic centimeter at 25° C. As used herein the term "density" refers to the weight/unit volume (grams/cubic centimeter) of the polymer at 25° C. The density of polymer should be determined while the sample of the polymer is at thermal and phase equilibrium. In order to insure this equilibrium it is desirable to heat the sample to a temperature 15 to 25 centigrade degrees above its melting point and allow the sample to cool at a rate of about 2 centigrade degrees/minute to the temperature at which the density is to be measured. Any standard method for determining the density of a solid can be used. The crystallinity of the olefin polymers can be determined by X-ray diffraction or nuclear magnetic resonance. Prior to the determination of crystallinity it is desirable that the sample of the polymer be treated for thermal equilibration in a manner described in connection with the density determination.

The higher crystalline olefin polymers referred to above do not have a single freezing and melting point but instead have a crystalline freezing point at which maximum crystalline formation occurs upon cooling of the molten polymer and a separate crystalline melting point at which evidence of crystallinity disappears upon heating a sample of the polymer from a cooled crystalline condition. Ordinarily the latter temperature is several degrees above the crystalline freezing point. The crystalline freezing point of these polymers can be determined by melting a sample of the polymer, inserting a thermocouple in the molten polymer and allowing the polymer to cool slowly. The temperature is recorded and plotted on a chart versus time. The crystalline freezing point is the first plateau in the time-versus-temperature curve. For polyethylene having a density of about 0.960, the crystalline freezing point is about 252° F. The crystalline melting point of these polymers can be determined by freezing a small piece of plastic (usually film) under crossed Polaroids in a microscope equipped with means for heating the polymer. The specimen is heated slowly and the melting point is the temperature at which birefringence disappears. For polyethylene having a density of about 0.960, the crystalline melting point is ordinarily about 272° F.

The optimum temperature for orientation is the highest temperature which can be achieved while the resin mass is still in a substantially crystalline condition. This temperature will vary depending upon the polymer used and its crystalline melting point. For ease of control it is desirable that this temperature be approached from below by heating a film of the polymer which is in a substantially uniform crystalline state. Nonuniformity in the crystalline condition of the polymer makes it difficult to stretch the tube to obtain a film of uniform gauge. In the continuous production of the film, therefore, it is desirable to form the tube, cool it to a crystalline state and then reheat the tube to the desired orientation temperature.

The first step in the film forming process is the extrusion of a tube of the desired diameter and wall thickness. The extrusion temperatures will vary considerably depending upon the polymer used. For example, for polymers such as high density polyethylene or polypropylene, extrusion temperatures of about 350 to 400° F. are frequently employed. As illustrated in FIGURE 1, molten polymer is fed in the conventional manner by an extruder 20 to a crosshead die 21. Crosshead die 21 is equipped with a mandrel 22 and a die 23, which together define an annular orifice through which the molten polymer is extruded in the form of a tube. The diameter and thickness of the tube thus extruded depends upon the desired size and thickness of the expanded and oriented tube and the degree of drawdown and expansion required to produce the desired physical properties.

As the tube issues from the die, it passes immediately into a cooling and sizing sleeve 24 which, with jacket 26, is attached through collar 27 to die head 21. Jacket 26 defines annular chambers 28 and 29 through which cooling liquid can be circulated in indirect heat exchange relationship with the tube passing through sleeve 24. In order to facilitate the operation on start-up and to insure that the tube makes close contact with the walls of sleeve 24, a plurality of vacuum ports 30 are provided with numerous holes connecting the ports to the space between tube wall and the cooling sleeve. Since there is usually a slight tendency of the tube to shrink as it is cooled, flange 31 with seal ring 32 is provided to seal the space between the tube wall and the cooling sleeve, thereby preventing loss of the vacuum. A plurality of O-rings 33 are provided between the jacket and the cooling sleeve in order to seal the annular spaces used for vacuum and cooling liquid.

In the sizing operation, at least the surface of the tube is cooled to a substantially crystalline condition, generally at least several degrees below the crystalline freezing point of the polymer. With the high density ethylene polymers, at least the surface of the tube is cooled to below about 250° F. Since it is necessary to insure that all of the polymer in the tube is in substantially uniform crystalline condition, the tube is then passed to a water bath 36 where it is placed in direct heat exchange with the water contained therein for a sufficient period of time to cool all of the polymer in the tube below the crystalline freezing point. Ordinarily the tube is further cooled in this operation to temperatures of about 210° F. or below. Water is circulated through bath 36 via inlet 37 and outlet 38. Flexible seals 39 and 40 at the entrance and exit, respectively, of the water bath prevent the water from being lost from the tank. Thus, the tube 34a is formed having the desired dimensions and with the polymer therein in uniform crystalline condition. In the manufacture of film for heavy bag material, for example, the tube will ordinarily have a diameter of about 2 to 6 inches and a thickness in the range of about 30 to 70 mils.

Once the operation has been started and is on a continuous basis, the gauge uniformity of the tube can be improved by employing relatively high internal pressures within the tube while it is in the cooling and sizing sleeve. Since relatively low pressures are necessary for the expansion of the tube during the orientation process, the apparatus shown in FIGURE 1 has been provided with two distinct pressure zones that can be maintained within the tube: an upstream high pressure zone for expanding the tube slightly against the walls of the sizing sleeve, and a downstream low pressure zone used for the orientation process. These two zones are maintained by a seal 41 which is positioned within the tube downstream from the sizing sleeve but upstream from the reheating operation. Conduit 42 passes axially through cross head die 21 and is connected to line 43. Line 43, which contains a pressure gauge 44 and a pressure regulator 46, is connected to a source of high pressure air through a conduit 47 and filter 48. Ordinarily a pressure in the range of about 10 to 30 lbs. per square inch gauge will be satisfactory for the purpose of expanding the tube against the walls of the sizing sleeve.

Conduit 42 is in open communication with the upstream zone 49 within the tube between mandrel 22 and seal 41. Seal 41 prevents the high pressure within zone 49 from being transmitted to the volume within the tube downstream from seal 41. Conduit 50 passes through seal 41 and axially through conduit 42. Conduit 50 communicates with the zone within the tube downstream from seal 41 and is connected through line 51, containing pressure gauge 52, to three-way valve 53. During normal operation, line 51 is connected through valve 53 to line 54, the latter carrying pressure regulators 56 and 57 and pressure gauge 58. Conduit 54 is also connected through line 47 to the high pressure air source, the pressure within line 54 at the three-way valve 53 is reduced to about 1 to 3 lbs. per square inch gauge by regulators 56 and 57. Thus the pressure within zone 49 can be maintained at about 10 to 30 lbs. per square inch for the purpose of sizing the tube in cooling sleeve 24, while the pressure for the orientation operation is maintained much lower, for example about 1 to 3 lbs. per square inch gauge. Where higher pressures are needed for initially expanding the tube in starting up the orientation process, three-way valve 53 is provided so that line 51 can be manually connected to the high pressure air source through line 59.

Referring now to FIGURE 2, a contoured jaw tube puller 60 is shown for the purpose of pulling the tube from the cooling sleeve and through the water bath and pushing the tube into a reheating bath 61. The speed of tube puller 60 is regulated so that tube 34a is pulled from the sizing sleeve slightly faster than the rate at which the tube is extruded from the die. The slight tension which is placed on the tube within the sizing sleeve causes a small reduction in tube thickness immediately after the tube is extruded and before it is cooled, and thereby improves the gauge uniformity of the tube. Tube puller 60 is provided with a plurality of contoured jaws 62 mounted in upper and lower chain sets 63 and 64, respectively. Chain set 63 is driven by sprocket wheels 66 which in turn are powered by a variable speed motor, not shown. Chain set 63 also turns on idler sprocket wheels 67. Chain set 64 is driven by sprocket wheels 68 which are geared to sprocket wheels 66. Chain set 64 also turns idler sprocket wheels 69. As chain sets 63 and 64 are rotated, the contour jaws 62 close about the tube 34a, gripping it firmly but without deformation, and advance the tube from the water bath into the reheating bath 61. An end view of the contour jaw tube puller is shown in FIGURE 3. In order to prevent slipping and deformation of the tube, resilient pads 70 are provided in each of the contour jaws.

Referring again to FIGURE 2, tube 34a, which is in a relatively cool uniform crystalline condition, is pushed by tube puller 60 into heating bath 61. Heating bath 61 comprises an elongated cylindrical shell 71 which is fastened at one end by a flange 72, having a resilient ring portion 73, to a head member 74. Head member 74 is equipped with a heating liquid inlet 76 and a liquid seal 77 made of rubber or Teflon. This seal prevents the heating liquid, which can be ethylene glycol, from leaking at the point at which the tube 34 enters the heating bath. In a similar manner, the shell 71 is attached at its other end by a flange 78 to a head member 79. Member 79 is equipped with the glycol outlet 80. The inside diameter of shell 71 is larger than the outside diameter of tube 34a, and the tube is supported within the shell by a helical rod 82. Rod 82 can be formed of metal and coated with polytetrafluoroethylene in order to reduce friction between the rod and the outside of the tube. The outside diameter of the helical rod corresponds approximately to the internal diameter of shell 71, and the internal diameter of the helical rod is approximately equal to the external diameter of tube 34a. A helical path is thus established encircling tube 34a from the inlet end of shell 71 to a region spaced from the outlet thereof. The heated glycol or other heat exchange fluid which may be used is forced to travel from top to bottom in this helical path encircling tube 34a, thereby insuring more uniform heating of the tube. The tendency of the heating fluid to stratify according to temperature is lessened and the temperature of the tube issuing from the heating bath is much more uniform. Improved uniformity of heating of the tube can be effected through the use of a helical wiper 83 attached to rod 82. Only a portion of wiper 83 is shown in FIGURE 2. This wiper is formed of resilient material, such as rubber, which is resistant to the hot heating fluid. Wiper 83 improves the seal between rod 82 and tube 34, thereby forcing better circulation of the heating fluid in the above-described helical path. Also, wiper 83 repeatedly wipes the liquid film from the outer surface of tube 34, thereby bringing about more efficient heat exchange between the tube and the heating fluid. It is desirable to construct shell 71 of a transparent material, such as Pyrex glass. By so doing the condition of the tube within the heating bath is clearly visible to an operator. Any tendency of tube 34a to buckle can be detected visually at a very early stage and the take-off rate can be increased slightly to avoid the problem.

The residence time of the tube within the heating bath must be sufficiently long that all of the polymer in the tube is brought to orientation temperature. This does not mean that the temperature of the tube need be uniform throughout, but there should not be more than a few degrees, for example, 1 to 5° F., difference between the inside and the outside of the tube. Depending upon the operation, the length of heating bath 61 can be increased or, as is frequently desirable, a plurality of such heating baths can be used so that the temperature gradient of the heating liquid between its inlet and outlet is minimized. From a practical standpoint, the length of the heating bath is limited by the friction between the tube and the guide rod. Necking of the tube within the bath must be avoided since otherwise the seal between the tank and the tube cannot be maintained and the heating fluid will leak from the bath.

The heating liquid can pass in either concurrent or countercurrent flow to the travel of the tube, but concurrent flow is preferred. If the temperature in the bath is too high there may be a tendency for the tube to stick to the helical rod. If the temperature of the bath is too low there is too little heat transfer between the bath and the tube. Ordinarily, the operation can be carried out so that the external surface temperature of the tube as it issues from the bath is substantially the same as the temperature of the heating liquid in the bath, and the internal temperature of the tube is within about 1 to 5° below the outside surface temperature.

As previously mentioned, it is quite important to prevent neckdown of the tube within heating bath 61, particularly near the outlet end. In accordance with this invention, such neckdown is prevented by the use of a vacuum drag ring 85. A conduit 86 connects this drag ring to the inlet of a vacuum pump 87. Drag ring 85 is illustrated in detail in FIGURE 4. A sleeve 88 is inserted into shell 71. The inner end of the sleeve is provided with a plurality of ears 89 which engage the inner wall of shell 71. The outer end of sleeve 88 is provided with a flange 90 which engages head member 79. An O-ring 91 provides a fluid-tight seal between flange 90 and member 79. A passage, not shown, is formed in member 79 and flange 90 to permit withdrawal of liquid from region 92 to outlet line 80 of FIGURE 2. A second O-ring 93 seals member 79 to shell 71. An annular sealing gasket 94 is positioned between shell 71 and flange 78.

An annular member 96 engages flange 90 and is secured to member 79 by a plurality of screws 97. As illustrated, member 96 is provided with a curved inner surface which guides the plastic tube as it emerges from the heater. Member 96 has a central passage 98 which is open to the inner wall of the member through a slot 99. A port 100 connects passage 98 with vacuum conduit 86 of FIGURE 2. The reduced pressure in passage 98 results in the plastic tube being pulled against sleeve 88 to eliminate neckdown. The inner end of sleeve 88 is provided with a groove 101 which receives an O-ring to seal the plastic tube against the sleeve, thereby preventing loss of liquid from shell 71. The degree of evacuation provided by pump 87 can vary, depending on the thickness of the plastic tube, its rate of withdrawal from the ring, and the internal pressure. However, it is generally desirable to employ a fairly high vacuum. For example, a vacuum of −29 inches of mercury is effective to reduce neck-in of the tube.

Referring now to FIGURE 5, tube 34b is expanded by internal fluid pressure and stretched in a linear direction as it emerges from heating bath 61. The trapped bubble method of operation is generally not adequate here so that the inflating gas must be in continuous supply and adequately pressured, as described in connection with FIGURE 1. The ratio of the final to the initial diameter of the tube depends upon the properties desired in the finished product. When working with tubes of highly crystalline olefin polymers, a clear, strong film can be produced using relatively high blow-up ratios, for example, from about 7 to 1 to about 10 to 1. It has been found, however, that the tough films which are most suitable for the production of bag material are made using lower blow-up ratios, for example about 3 to 1 to about 6 to 1, and preferably a blow-up ratio of about 4 to 1 is employed for this purpose. The amount of stretch in both the machine and transverse directions should be approximately equal to obtain balanced properties in the film. Some improvement in gauge uniformity can be obtained, however, if the machine direction stretch ratio is slightly higher than the transverse direction blow-up ratio.

The temperature at which the orientation is carried out is dependent upon the polymer employed. Using an ethylene polymer having a density of about 0.960 gram per cubic centimeter at 25° C., the orientation should be carried out at a temperature in the range of 260 to 270° F., preferably in about the middle of this range. Better guage uniformity can thereby be obtained than when operating at somewhat lower temperatures. These temperatures refer to the temperature of the polymer immediately after it issues from the heating bath when stretching begins. It has been found that once stretching has started it will proceed satisfactorily at progressively lower temperatures. The best balance of properties can be obtained, therefore, by directing a cooling gas on the outside of the expanding tube so that the temperature of the tube decreases while it is undergoing the biaxial orientation. As shown in FIGURE 5, cooling air is supplied tangentially at an inlet 104 to an open ring number 106 which is positioned immediately downstream from the heating bath 61 so that the tube must pass through ring 106 as it expands. In the absence of cooling gas supplied by ring number 106, there is a tendency for the temperature of the film undergoing biaxial orientation to rise because of the mechanical work being performed on it. The stretching takes place immediately after the tube issues from the heating bath so that this portion of the operation is carried out in a relatively short distance, for example, about 2 to 10 inches, depending upon the diameter to which the tube is inflated. Even though the ambient atmosphere is at a temperature far below that of the tube as it issues from the bath, it has been found that no significant cooling of the tube occurs in the absence of a direct effort to circulate cooling gas about the tube. The stagnant air film effectively insulates the expanding tube and, in any event, the heat loss to the surrounding atmosphere does little more than offset the heat generated within the tube as a result of the mechanical work performed on it.

After the tube has expanded to the desired diameter, it passes into a final sleeve 107 where it is chilled by cooling liquid circulating through coils 108. Sleeve 107 can be aluminum with a chrome plating polished to a satin finish. The expanded tube is cooled sufficiently in sleeve 87 that further stretching is prevented in either direction. In place of cooling sleeve 87, jets of cooling gas can be used to chill the tube to a temperature far below that necessary for orientation, and thereby prevent further radial or longitudinal stretching. This final cooling step should not be confused with the cooling air impinged upon the expanding bubble by air ring 106. The cooling gas distributed by ring 106 produces a cooling gradient across the expanding tube, but maintains the tube at orientation temperature. The cooling which is carried by sleeve 107 cools the tube after orientation has been completed and serves to set the orientation and prevent further expansion.

Expanded and oriented film which is to be used for bags will ordinarily have a thickness of about 1 to 5 mils, and the diameter of the tube can vary from about 8 to 24 inches. Of course, other combinations of dimensions are possible and depend upon the use to which the film is put. The expanded and oriented film passes from chilling sleeve 107 to a collapsing stand 109 which comprises upper and lower roller trains 110 and 111, respectively, which converge towards pinch rolls 112. Pinch rolls 112, which seal the air pressure within the tube, are power driven in order to place the necessary tension on the tube required for the longitudinal stretching and orientation. The speed of pinch rolls 112 is adjusted so that the take-off rate of the film is faster than the rate at which the tube issues from the heating bath 61. The ratio of these two speeds determines the machine direction stretch ratio. The collapsed tube then passes over idler rolls 113 and 114 and between a second set of pinch rolls 116 before it is taken up on a reel 117.

While this invention has been described in conjunction with a presently preferred embodiment, it obviously is not limited thereto.

What is claimed is:

1. A process for eliminating longitudinal stretching of a thin flexible tubular film in a tubular heating zone which heats said tubular film to orientation temperature so that said film can be biaxially oriented beyond said heating zone, the process comprising creating a sufficient vacuum between said tube and the boundary of said tubular heating zone at the outlet end of said zone to draw said tubular film against said boundary to produce a drag on said film while in contact with said boundary, said drag being sufficient to substantially prevent longitudinal stretching of said film while in said heater, without substantial cooling of said film.

2. A process according to claim 1 wherein said tubular film is expanded radially outwardly as it passes from the outlet end of said tubular heating zone.

3. A method according to claim 1 wherein said tubular film is heated by passing a heated fluid in contact with the outer surface of said tubular film within said tubular heating zone and said vacuum substantially prevents said fluid from seeping out of said outlet end of said tubular heating zone by drawing said film against said boundary of said tubular heating zone at the outlet end thereof.

References Cited by the Examiner

UNITED STATES PATENTS

| | | | |
|---|---|---|---|
| 2,936,491 | 5/1960 | Hamlin | 264—95 |
| 2,963,742 | 12/1960 | Ahlich et al. | |
| 3,166,616 | 1/1965 | Bild et al. | 264—95 |
| 3,169,272 | 2/1965 | Maxson | 264—95 |
| 3,213,165 | 10/1965 | Pollock | 264—95 |

FOREIGN PATENTS

| | | |
|---|---|---|
| 880,391 | 10/1961 | Great Britain. |
| 629,728 | 10/1961 | Canada. |

ALEXANDER H. BRODMERKEL, *Primary Examiner.*

F. S. WHISENHUNT, *Assistant Examiner.*